United States Patent [19]
Kronenberger et al.

[11] Patent Number: 4,984,908
[45] Date of Patent: Jan. 15, 1991

[54] PRE-SEAL FOR MAGNETIC LIQUID SEAL FOR AN ANTI-FRICTION BEARING

[75] Inventors: Alban Kronenberger, Schweinfurt; Oswald Bayer, Aidhausen, both of Fed. Rep. of Germany

[73] Assignee: FAG Kugelfischer Georg Schafer (KGaA), Fed. Rep. of Germany

[21] Appl. No.: 505,054

[22] Filed: Apr. 5, 1990

[30] Foreign Application Priority Data

Apr. 11, 1989 [DE] Fed. Rep. of Germany ... 8904503[U]

[51] Int. Cl.⁵ .............................................. F16C 33/82
[52] U.S. Cl. .................................... 384/478; 384/446; 277/80
[58] Field of Search ............... 384/478, 446, 484, 488, 384/133, 147; 277/80

[56] References Cited
U.S. PATENT DOCUMENTS
4,692,826  9/1987  Raj et al. ............................. 384/478
4,761,082  8/1988  Gabelli ................................. 384/133

FOREIGN PATENT DOCUMENTS
3824104  1/1989  Fed. Rep. of Germany .

Primary Examiner—Lenard A. Footland
Attorney, Agent, or Firm—Ostrolenk, Faber, Gerb and Soffen

[57] ABSTRACT

A magnetic liquid seal for an anti-friction bearing, the seal comprising an annular magnet and annular pole rings with respective supplies of magnetizable liquid radially between the pole rings and the inner ring. A pre-seal element with a lip extending toward the inner ring is supported on that axial side of the magnet that is toward the rolling element balls. A notch is defined in the inner race radially generally centered beneath the lip. The opposite axial side surfaces of the notch are obliquely outwardly inclined in the radially outward direction.

10 Claims, 1 Drawing Sheet

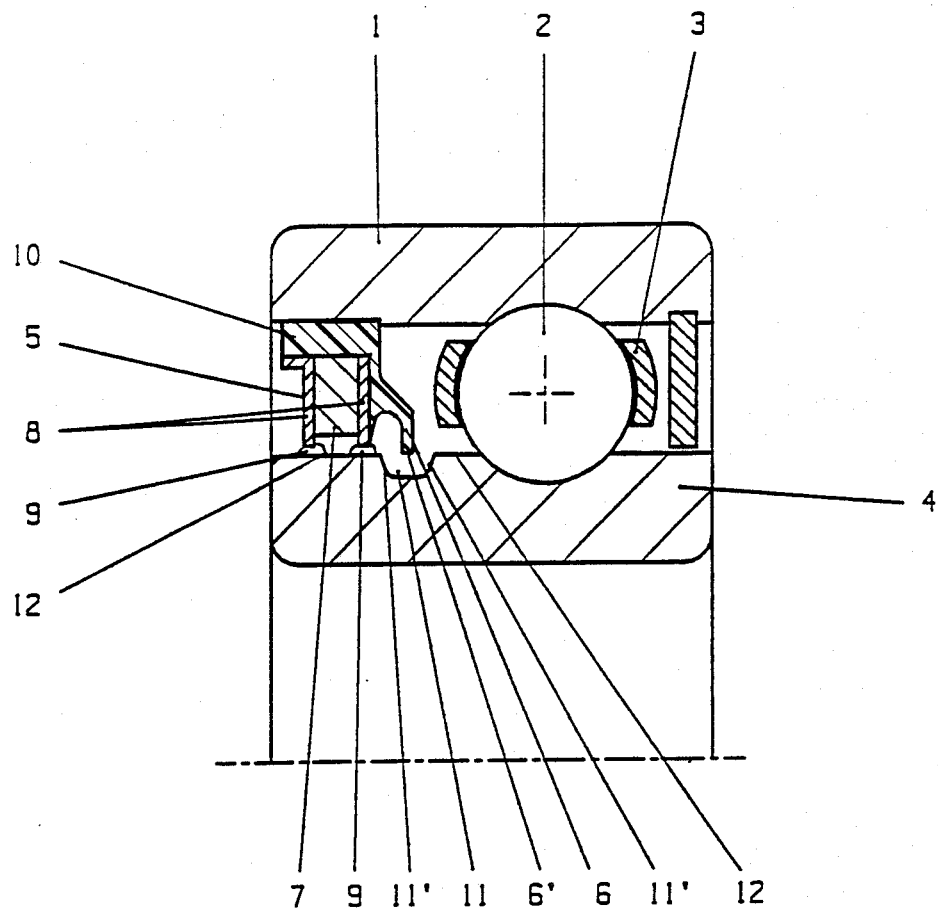

PRE-SEAL FOR MAGNETIC LIQUID SEAL FOR AN ANTI-FRICTION BEARING

BACKGROUND OF THE INVENTION

The present invention refers to a magnetic liquid seal for an antifriction bearing and to a magnetic liquid return feature of the seal and bearing.

One liquid seal embodiment is known from Federal Republic of Germany Published Application OS 3,824,104. In that case, both the magnetic liquid seal and a pre-seal element on the axial side of the seal closer to the bearing rollers face a set back section of the inner ring of the bearing. This seal is highly expensive particularly for the manufacture of its inner ring. The shoulder of the inner ring must be made in stepped-down shape, i.e. two surfaces which are arranged displaced with respect to each other must be machined both upon the turning and upon the grinding. Another disadvantage is that the pre-seal must be precisely positioned axially in order, on the one hand, to obtain the desired sealing action and, on the other hand, to prevent the resting of the pre-seal against the mating bearing race. Such resting produces an impermissible increase in the moment of friction in many fields of use. This requires an exact arrangement and exact axial positioning of the notch, particularly a notch formed in the inner ring, into which a lip of the seal extends. Furthermore, the separate pre-seal must also be arranged in an additional holding groove in the outer ring. This also makes installation of the seal and of the bearing difficult.

SUMMARY OF THE INVENTION

The object of the present invention is, therefore, to provide a magnetic liquid seal for a bearing, which does not have the above indicated disadvantages, which is simple to develop and manufacture, and which has a sealing action that is as good as possible without an increase in the moment of friction.

The magnetic liquid seal of the invention is used in an anti-friction bearing which typically includes an inner race element, which may be an inner ring, and an outer race element, which is typically an outer ring that is radially spaced from and passes around the inner race element. A row of rolling elements, e.g. bearing balls, are supported between the inner and outer race element and are usually guided by a separator or cage.

At at least one axial side of the row of rolling elements there is a seal for preventing dirt from getting into and liquid from exiting the space between the inner and outer race elements. The seal of the invention is a magnetic liquid seal. It comprises an annular magnet in the space between the race elements. At least one pole ring is disposed axially next to the magnet and typically there are two pole rings at opposite axial sides of the magnet. The pole rings extend toward one of the race elements, and typically toward the race which is relatively movable with respect to the other, e.g. the inner race element. The pole rings do not extend radially entirely to the one race element. Instead, there is a radially short gap between the radial edge of the pole ring and the adjacent race element which is filled by an axially narrow pool of magnetizable liquid in the small gap and this completes the seal at the magnetic liquid seal.

A pre-seal element is supported at the magnet, and typically at one of the pole rings, on the axial side of the magnet and the pole ring that is toward the rolling elements. The pre-seal includes a lip that extends toward the one race element at which the magnetic liquid is supported. According to the invention, a notch is defined in the surface of that race element toward which the lip extends and the notch and the lip are so positioned that the lip extends generally toward the axial center of the notch, whereby any liquid that enters the notch is thrown up into the seal and/or is returned to the bearing element and does not escape. The pre-seal is integrated with the magnetic liquid seal as a unit, which eases installation of that assembly into the bearing. For example, the pre-seal may comprise the aforesaid lip and an axial extension that supports the lip and extends axially past the pole rings and the magnet on the radial side of the magnet away from the race element having the notch in it.

For improving the slinging of any liquid that first escapes into the notch, the axial side edges of the notch are obliquely inclined axially outwardly from each other in the radial direction out of that notch, so that the notch widens toward its open side. This directs the magnetic liquid as desired.

As the free circumferential edge of the pre-seal faces and is radially spaced from a circumferential notch in the mating surface, for instance a notch in the inner ring near the inner race, a good sealing place is obtained here. Any fluid which is present on the inner ring will, upon the axial travel, be slung off in the region of the notch when the inner ring is rotating, in each case on the side of the pre-seal which makes penetration into the other space impossible. This embodiment is advantageous from the standpoint of manufacture and assembly because only one surface need be machined upon the turning and grinding, and that surface is interrupted only by a notch which is simple to produce.

Since the pre-seal is integrated with the magnetic liquid seal, a unit which can be easily handled is obtained before assembly. In this way, the installation of the seal itself is simplified. It need not be precisely positioned since it is sufficient for the pre-seal and the notch to be approximately opposite each other without the sealing action being thereby reduced.

In a preferred embodiment, the side surfaces of the notch are inclined obliquely axially away from each other radially outward through the notch of the inner ring. When the inner ring is rotating, there is a slinging effect with an axial component. In this way, both the lubricant and the magnetic liquid are better returned to the desired place.

BRIEF DESCRIPTION OF THE DRAWING

Other objects and features of the invention are explained with reference to the drawing, which shows a cross-section through part of a ball bearing having a seal in accordance with the present invention.

DESCRIPTION OF THE PREFERRED EMBODIMENT

A ball bearing according to the invention comprises an outer ring 1, the circumferential row of rolling elements or balls 2 with their cage or separator 3, and the inner ring 4. The balls are guided in races defined in the rings 1, 4. The inner ring may be replaced by a shaft, or the like, so it is more generally sometimes called the inner race element. The outer ring is also more generally sometimes called the outer race element.

On one axial side of the bearing, a magnetic liquid seal 5 is installed. It is integrated with a pre-seal 6 and the pre-seal is axially nearer to the row of balls 2 than is the seal 5. The seal 5 is comprised of a ring magnet 7 and at least one or, as shown, preferably two annular pole rings 8 enclosing the ring 7 on opposite axial sides. The pole rings 8 magnetically hold annular, axially narrow and radially narrow pools of magnetic liquid 9 fast at the radially narrow gaps between the rings 8 and the inner ring 4 so that the liquid 9 cooperates to produce a hermetic seal at 5. Since the pre-seal 6 is integrally connected with the magnetic-liquid seal 5, simple manufacture is enabled, since the radially outward surrounding plastic ring 10 merely has an extension at 6, which is very simple from the standpoint of casting.

The annular pre-seal 6 has an annular sealing lip 6' which faces radially inward toward an annular notch 11 that is formed in the periphery of the inner ring 4. This improves the sealing action. Since the sealing lip 6' does not extend into the notch 11, approximately central axial positioning of the lip 6' over the notch 11 is sufficient. In no case is there any application of force against any section of the inner ring 4 which would increase the moment of friction. Nevertheless, simple manufacture of the section of the race in this region of the ring 4 is possible. It is necessary to machine precisely only one surface 12 in which the less precise circumferential notch 11 is formed.

When the inner ring 4 is rotating, the magnetic liquid and any bearing lubricant is slung back obliquely axially into the sealing slot or bearing space when the outer end sections of the side surfaces 11' of the notch 11 are directed obliquely axially and away from each other Although the present invention has been described in relation to particular embodiment thereof, many other variations and modifications and other uses will become apparent to those skilled in the art. It is preferred, therefore, that the present invention be limited not by the specific disclosure herein, but only by the appended claims.

What is claimed is:

1. A magnetic liquid seal assembly for an anti-friction bearing, wherein
   the bearing comprises an inner race element, an outer race element radially spaced from and around the inner race element and a row of rolling elements between the inner race element and the outer race element;
   a magnetic liquid seal at one axial side of the rolling elements between the inner race element and the outer race element for sealing the space between the inner race element and the outer race element, the magnetic liquid seal comprising an annular magnet in the space;
   at least one pole ring next to the magnet, the pole ring extending radially toward but being out of contact with one of the inner race element and the outer race element, a magnetizable liquid disposed between the pole ring and the race element toward which the pole ring radially extends;
   a pre-seal supported at the magnet and at the pole ring on the axial side of the magnetic liquid seal that is toward the rolling elements, the pre-seal including a lip extending toward the one of the inner race element and the outer race element;
   the magnetic liquid seal being integrated with the pre-seal as a unit;
   a notch defined in the surface of the one of the inner race element and the outer race element and positioned with respect to the pre-seal lip such that the pre-seal lip extends toward the notch without contacting in the notch.

2. The magnetic liquid seal assembly of claim 1, wherein the one of the inner race element and the outer race element has edge surfaces on both axial sides of the notch, the edge surfaces having the same diameter.

3. The magnetic liquid seal assembly of claim 2, wherein the one of the inner race element and the outer race element is rotatable so that the notch rotates.

4. The magnetic liquid seal assembly of claim 3, wherein the one of the inner race element and the outer race element is the inner race element.

5. The magnetic liquid seal assembly of claim 4, wherein the outer race element is an outer ring.

6. The magnetic liquid seal assembly of claim 2, wherein the notch has axial ends defined by side surfaces of the notch, and the side surfaces of the notch are directed obliquely axially outwardly in the direction radially out of the one of the inner race element and the outer race element and toward the other race element.

7. The magnetic liquid seal assembly of claim 1, wherein the one of the inner race element and the outer race element is rotatable so that the notch rotates.

8. The magnetic liquid seal assembly of claim 7, wherein the one of the inner race element and the outer race element is the inner race element.

9. The magnetic liquid seal assembly of claim 1, wherein the magnet has axially opposite sides and there is respective one of the pole rings at each axially opposite side of the magnet, and the pole rings both extend in the safe direction and there is a respective supply of magnetizable liquid at each pole ring.

10. The magnetic liquid seal assembly of claim 9, wherein the pre-seal comprises a lip secured to one of the pole rings and an axial extension from the lip axially past the pole ring and past the magnet for securing the pre-seal to the seal.

* * * * *